United States Patent [19]

Ueda

[11] Patent Number: 5,605,341

[45] Date of Patent: *Feb. 25, 1997

[54] KNITTING YARN FOR GLAND PACKING AND GLAND PACKING MADE FROM THE KNITTING YARN

[75] Inventor: Takahisa Ueda, Sanda, Japan

[73] Assignee: Nippon Pillar Packing Co., Ltd., Osaka, Japan

[*] Notice: The term of this patent shall not extend beyond the expiration date of Pat. No. 5,503,057.

[21] Appl. No.: 565,582

[22] Filed: Nov. 30, 1995

Related U.S. Application Data

[63] Continuation of Ser. No. 402,556, Mar. 13, 1995, which is a continuation of Ser. No. 6,523, Jan. 21, 1993, abandoned.

[51] Int. Cl.[6] ..................................................... F16J 15/20
[52] U.S. Cl. .......................... 277/204; 277/227; 277/230
[58] Field of Search .................................... 277/204, 229, 277/230, 227

[56] References Cited

U.S. PATENT DOCUMENTS

| | | | |
|---|---|---|---|
| 1,171,090 | 2/1916 | Cook | 277/230 |
| 1,325,950 | 12/1919 | McClure | 277/230 |
| 1,695,682 | 12/1928 | Creamer | 277/229 |
| 3,341,211 | 9/1967 | Houghton et al. | 277/230 |
| 4,455,334 | 6/1984 | Ogino et al. | 277/230 |
| 4,705,722 | 11/1987 | Ueda et al. | 277/230 |
| 5,134,030 | 7/1992 | Ueda et al. | 277/230 |
| 5,225,262 | 7/1993 | Leduc | 277/229 |
| 5,240,769 | 8/1993 | Ueda et al. | 277/230 |

FOREIGN PATENT DOCUMENTS

| | | | |
|---|---|---|---|
| 0444456 | 9/1991 | European Pat. Off. | 277/230 |
| 60-84476 | 5/1985 | Japan | 277/230 |
| 63-1863 | 1/1988 | Japan | 277/230 |

Primary Examiner—William A. Cuchlinski, Jr.
Assistant Examiner—John L. Beres
Attorney, Agent, or Firm—Jones, Tullar & Cooper, P.C.

[57] ABSTRACT

A knitting yarn for gland packing according to the present invention has a composite structure comprising: a string-like body formed by folding an expanded graphite tape in the widthwise direction thereof thus forming folded layers; a first reinforcing member made of a knitted or braided body for covering the entire outer peripheral surface of the string-like body; and/or a yarn-like second reinforcing member interposed between the folded layers of the string-like body in the longitudinal direction thereof. A plurality of such knitting yarns are braided or twisted to form a gland packing. According to the present invention, the formation of an expanded graphite tape is facilitated and no slip is presented between the folded layers, thus providing a knitting yarn for gland packing excellent in strength and shape retention. With the use of such knitting yarns, brading or twisting can be facilitated and the resulting gland packing can be considerably improved in sealing performance.

4 Claims, 4 Drawing Sheets 5,605,341

KNITTING YARN FOR GLAND PACKING AND GLAND PACKING MADE FROM THE KNITTING YARN

This is a continuation of application Ser. No. 08/402,556 filed on Mar. 13, 1995, which is a continuation application of Ser. No. 08/006,523, filed Jan. 21, 1993, now abandoned.

BACKGROUND OF THE INVENTION

1. Field of the Invention

The present invention relates to a knitting yarn for a gland packing to be used at a shaft sealing portion of a fluid device such as a pump, and also relates to a gland packing made of such knitting yarn.

2. Description of the Prior Art

The following packings are known as gland packings of the type mentioned above.

One packing is made by spirally or concentrically winding a tape-like expanded graphite having an excellent compression-restoring force and sealing properties, and pressing and molding, in molds, the expanded graphite thus wound, thereby to form a ring-like gland packing of the die-mold type. Another packing is made by punching expanded graphite into ring-like pieces and laminating and molding a plurality of ring-like pieces thus punched, thereby forming a gland packing of the laminate type.

Out of such conventional gland packings, the packing of the die-mold type can be applied to a shaft having a predetermined diameter but and cannot be applied to shafts having different diameters. Thus, such a packing lacks versatility. It is therefore required to previously prepare a variety of packings having different diameters in order to deal with shafts having different diameters. Further, expanded graphite itself is poor in tensile strength, and is therefore fragile. Accordingly, when it becomes necessary to replace such a packing mounted in the packing box, it is difficult to take out the packing from the packing box, thus presenting a problem in view of practical utility.

Further, such a gland packing is arranged such that layers are formed in the radial direction. This tends to produce an axial slip of the layers between adjacent layers. This causes portions of the packing to protrude into gaps, for example, between the shaft and the packing box, between the shaft and the packing gland and between the packing box and the packing gland. This reduces the volume of the packing and leases the applied stress, causing the sealing properties to be lowered. This not only increases the amount of leakage of a fluid, but also provokes the permeation and leakage of the fluid from the layers.

On the other hand, the gland packing of the laminate type is arranged such that layers are formed in the axial direction. This prevents portions of the packing from protruding into the gaps due to axial slip as done in the gland packing of the die-mold type. This advantageously restrains the sealing properties from being lowered because of the release of stress due to reduction in volume. However, the gland packing of the laminate type presents the problems of poor versatility for different shaft diameters and difficulty in taking out such a gland packing from the packing box for replacement, etc., likewise the packing of the die-mold type. Further, the gland packing of the laminate type inevitably produces a great amount of material loss, thus increasing the production cost.

The problems mentioned above can be solved by proposing a braided packing with the use of expanded graphite which is braided or twisted such that the expanded graphite can be used as cut according to the diameter of a shaft, as done in a conventional braided packing.

The expanded graphite itself is a particle (powder) having a green-caterpillar-like appearance as expanded in the C-axis direction of a graphite particle crystal. The expanded graphite is poor in tensile strength and is fragile. Accordingly, the expanded graphite alone cannot be used as a knitting yarn to be braided or twisted.

In this connection, a variety of proposals have been made such that expanded graphite is used as a knitting yarn to be braided or twisted.

In FIG. 12 showing one of such proposal, a knitting yarn 14 is made of a string-like body 13 having a composite structure which comprises an expanded graphite tape 11 so cut as to have a narrow width and a yarn-like reinforcing member 12, the expanded graphite tape 11 being spirally wound on the outer periphery of the yarn-like reinforcing member 12. In FIG. 13, showing another proposal, a knitting yarn 24 has a composite structure which comprises (i) a string-like body 13 in which a plurality of narrow-width expanded graphite tapes 11 are laminated, and (ii) a reinforcing braided member 15 made by knitting or circular-knitting fibers, the reinforcing braided member 15 covering the entire outer periphery of the string-like body 13. In FIG. 14, showing a further proposal, a knitting yarn 34 has a composite structure which comprises (i) a string-like body 13 in which a plurality of narrow-width expanded graphite tapes 11 are laminated, (ii) a plurality of yarn-like reinforcing members 16 interposed between adjacent layers in the longitudinal direction thereof, and (iii) a reinforcing braided member 15 made by knitting or circular-knitting fibers, the reinforcing braided member 15 covering the entire outer periphery of the string-like body 13. In FIG. 15, showing still another proposal, a knitting yarn 44 has a composite structure comprising (i) a plurality of yarn-like reinforcing members 16 and (ii) green-caterpillar-like expanded graphite particles 11B integrally bonded to both surfaces of the yarn-like reinforcing members 16.

Out of the four different knitting yarns using expanded graphite, the knitting yarn 14 in FIG. 12 is made by cutting an expanded graphite sheet into the expanded graphite tape 11 having a narrow width. Cutting the expanded graphite sheet into narrow-width tapes is itself very difficult. Further, the knitting yarn 14 is made by merely spirally winding the narrow-width expanded graphite tape 11 on the outer periphery of the yarn-like reinforcing member 12 such that the tape 11 covers the yarn-like reinforcing member 12. Accordingly, the integrally bonding force between the expanded graphite tape 11 and the yarn-like reinforcing member 12, is small so that the knitting yarn 14 is poor in shape retention. Thus, the tape 11 and the yarn-like reinforcing member 12 are liable to be separated from each other. When the knitting yarn 14 is poor in shape retention, it is difficult to braid or twist the knitting yarn 14 to produce a gland packing. Also, the resulting gland packing itself is poor in shape retention, thus lowering its sealing performance as a packing.

In the knitting yarn 24 in FIG. 13, the integrally bonding force between the string-like body 13 made of the expanded graphite tapes 11 and the reinforcing braided member 15, is strong and therefore superior in shape retention to the knitting yarn 14 in FIG. 12. This restrains the string-like body 13 and the member 15 from being separated from each other. However, cutting an expanded graphite sheet into narrow-width tapes 11 is itself very difficult likewise in the knitting yarn 14 in FIG. 12. Further, knitting yarn 24 in FIG.

13 is liable to present the relative movement or interlaminar slip among the layers of the string-like body 13 in which the plurality of expanded graphite tapes 11 are laminated. When forming a gland packing from the knitting yarns 24 comprising the string-like body 13, which is liable to present such interlaminar slip, the expanded graphite tapes 11 are liable to be broken when braiding or twisting the knitting yarns 24. This makes braiding or twisting difficult, preventing the resultant gland packing from being provided with a high sealing performance.

Likewise the knitting yarn 24 in FIG. 13. The knitting yarn 34 in FIG. 14 has a strong integrally bonding force between the string-like body 13 made of the expanded graphite tapes 11 and the reinforcing braided member 15. This not only produces an excellent shape retention, but also restrains the body 13 and the member 15 from being separated from each other. Further, the joint use of the yarn-like reinforcing members 16 further enhances strength. However, the knitting yarn 34 presents the problem that cutting an expanded graphite sheet into the narrow-width expanded graphite tapes 11 is itself very difficult and that the string-like body 13 is liable to present interlaminar slip, as in the knitting yarn 24 shown in FIG. 13. In addition, the interlaminar slip weakens the integrally bonding force between the string-like body 13 and the yarn-like reinforcing members 16, so that the yarn-like reinforcing members 16 are liable to be unevenly distributed. This injures uniformity of strength. With the use of the knitting yarn 34 presenting such interlaminar slip and uneven distribution of the yarn-like reinforcing members 16, the expanded graphite tapes 11 are liable to be broken when braiding or twisting the knitting yarn 34 in order to produce a gland packing. Further, the uneven strength prevents the sealing performance of the packing from being sufficiently increased.

In the knitting yarn 44 in FIG. 15, it is difficult to arrange expanded graphite particles in high density, as well as to manufacture large-size particles of expanded graphite. Further, the plurality of yarn-like reinforcing members 16 are liable to be separated from one another, thus preventing the sealing performance of the packing from being enhanced.

SUMMARY OF THE INVENTION

In view of the foregoing, the present invention is proposed with the object of providing a knitting yarn for gland packing in which the formation of an expanded graphite tape by cutting an expanded graphite sheet is facilitated, and the formation of a string-like body serving as the main body of the knitting yarn is also facilitated, which presents no interlaminar slip, the strength of which is uniform and is excellent in shape retention.

It is another object of the present invention to provide a gland packing which is made with the use of the knitting yarn mentioned above to be readily braided or twisted, and which can be considerably improved in sealing performance.

It is a further object of the present invention to provide a gland packing considerably increased in strength.

To achieve the objects mentioned above, the knitting yarn for gland packing according to the present invention has a composite structure comprising: a string-like body formed by folding an expanded graphite tape in the widthwise direction thereof thus forming folded layers and the formation of at least a mountain or valley portion in the longitudinal direction, a first reinforcing member made of a knitted or braided body for covering the entire outer peripheral surface of the string-like body; and/or a yarn-like second reinforcing member interposed between the folded layers of the string-like body in the longitudinal direction thereof.

In the knitting yarn having the arrangement mentioned above, the expanded graphite tape for forming the string-like body is folded in the widthwise direction thus forming folded layers thereof and the formation of at least a mountain or valley portion in the longitudinal direction. Accordingly, an expanded graphite sheet is not required to be cut into narrow-width tapes, but can be cut into wide-width tapes. This facilitates the formation of the expanded graphite tape. Further, because of the adoption of the folded-layer structure, the string-like body does not present the relative movement of the folded layers, i.e., interlaminar slip.

Further, the knitting yarn has a composite structure comprising the string-like body, the first reinforcing member made of a knitted or braided body for covering the entire outer periphery of the string-like body, and/or the second reinforcing member interposed between the folded layers in the longitudinal direction thereof. This increases the integrally bonding force between the string-like body and the reinforcing members, thus restraining the string-like body and the reinforcing members from being separated from each other. This improves the knitting yarn in strength and shape retention. Accordingly, braiding or twisting such a knitting yarn can be facilitated. Further, a gland packing made by braiding or twisting such a knitting yarn can present good shape retention, thus improving the gland packing in its sealing performance.

In particular, when the knitting yarn for gland packing has a composite structure jointly using the first reinforcing member and the yarn-like second reinforcing member, or when the knitting yarn for gland packing Uses the expanded graphite tape which is so cut as to have a wide width and which is subjected in the longitudinal direction thereof to crimpling molding by corrugating or embossing, the knitting yarn can be further improved in strength and shape retention.

The gland packing of the present invention comprises a plurality of knitting yarns which are braided or twisted as bundled, each knitting yarn having a composite structure which comprises: a string-like body formed of an expanded graphite tape to have at least a mountain or valley portion in the longitudinal direction and folded in the widthwise direction thereof thus forming folded layers a first reinforcing member made of a knitted or braided body for covering the entire outer peripheral surface of the string-like body; and/or a yarn-like second reinforcing member interposed between the folded layers of the string-like body in the longitudinal direction thereof.

According to the present invention, the gland packing is made by bundling and braiding or twisting a plurality of the knitting yarns excellent in strength and shape retention as above mentioned. This prevents the expanded graphite tapes from being cut when braiding or twisting the knitting yarns. This not only facilitates the production of the gland packing by braiding or twisting the knitting yarns, but also assures uniformity of strength, thus improving the sealing performance of the gland packing.

According to the present invention, the gland packing may comprise a rod-like center member and a covering layer made of a knitted or braided body which covers the outer periphery of the center member. The center member comprises a plurality of knitting yarns which are braided or twisted as bundled, each knitting yarn having a composite structure which comprises: a string-like body formed of an expanded graphite tape to have at least a mountain or valley portion in the longitudinal direction and folded in the widthwise direction thereof, thus forming folded layers; a first reinforcing member made of a knitted or braided body for covering the entire outer peripheral surface of the string-like body; and/or a yarn-like second reinforcing member interposed between the folded layers of the string-like body in the longitudinal direction thereof.

The gland packing having the arrangement mentioned above has a composite structure comprising the rod-like center member formed by bundling, braiding or twisting a plurality of the knitting yarns mentioned above, and the braided body which covers the entire outer periphery of the rod-like center member. Accordingly, the gland packing is considerably improved in strength, in addition to having excellent sealing performance.

Other objects and effects of the present invention will be apparent from the following description of embodiments thereof.

Detailed Description of the Preferred Embodiments

The following description will discuss embodiments of the present invention with reference to the attached drawings.

Figure 1:
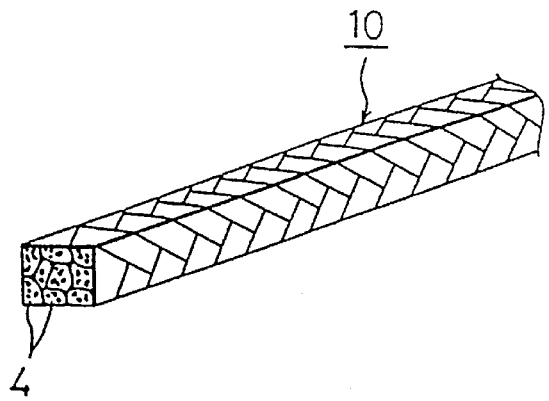
FIG. 1 is a perspective view of a first embodiment of the gland packing according to the present invention.
Figure 2:
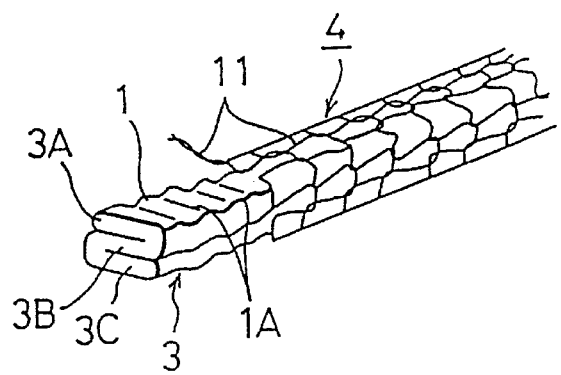
FIG. 2 is a perspective view of a first embodiment of the knitting yarn for gland packing according to the present invention.

FIG. 1 is a perspective view of a first embodiment of the gland packing according to the present invention. A gland packing 10 in FIG. 1 is made in the following manner. As shown in FIG. 2, a knitting yarn 4 has a composite structure comprising a string-like body 3 and a first reinforcing member 11. The string-like body 3 comprises an expanded graphite tape 1 cut from an expanded graphite sheet (not shown) such that the tape 1 has a wide width. The expanded graphite tape 1 is subjected in the longitudinal direction thereof to crimpling molding (wrinkling) 1A by corrugating or embossing to present mountain and valley portions, and is then folded in the widthwise direction thereof, thus forming folded layers 3A, 3B, 3C, which in cross section define an S-shape (FIG. 2). The string-like body 3 is covered at the entire outer periphery thereof with the first reinforcing member 11 comprising a knitted body. Nine pieces of such knitting yarns 4 are square-knitted as shown in FIG. 1.

More specifically, the knitting yarn 4 shown in FIG. 2 is made in the following manner. An expanded graphite tape 1 having a thickness of 0.38 mm and a width of 9 mm is subjected at both surfaces thereof to the crimpling molding 1A and then folded in the longitudinal direction thereof such that the folding line of the expanded graphite tape 1 in section presents an S shape, thus forming the folded layers 3A, 3B, 3C. The string-like body 3 is covered over the entire surface thereof with the first reinforcing member 11 comprising a knitted body made of an Inconel wire having a diameter of 0.1 mm.

In the gland packing of the first embodiment, it is not required to cut an expanded graphite sheet into tapes each having a narrow width, when forming the string-like body 3. This facilitates the formation of the expanded graphite tape 1.

Further, the string-like body 3 is made by folding the wide-width expanded graphite tape 1 in the widthwise direction thereof, thus forming the folded layers 3A, 3B, 3C. Accordingly, there is formed the knitting yarn 4 presenting no slip among the folded layers 3A, 3B, 3C. Therefore, when braiding the knitting yarn 4 for manufacturing the gland packing 10, the expanded graphite tape 1 is not broken or cut, facilitating braiding. Thus, there can be obtained a gland packing 10 having excellent sealing performance.

Further, since the string-like body 3 is covered over the entire outer periphery thereof with the first reinforcing member 11, the integrally bonding force between the string-like body 3 and the first reinforcing member 11 is strong to restrain the string-like body 3 and the first reinforcing member 11 from being separated from each other. This improves the shape retention of the knitting yarn 4. From this point of view, too, the braiding can be facilitated to improve the gland packing 10 in its sealing performance.

Figure 3:
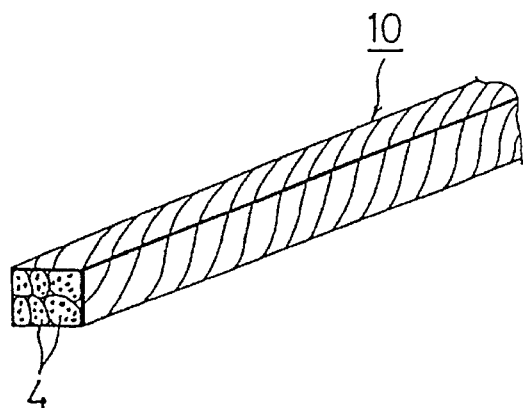
FIG. 3 is a perspective view of a second embodiment of the gland packing according to the present invention.

FIG. 3 is a perspective view of a second embodiment of the gland packing according to the present invention. In the second embodiment, the same and like parts are designated by the same reference numerals used in the first embodiment. The detailed description of these same and like parts is omitted here.

A gland packing 10 shown in FIG. 3 is made by rolling six pieces of the knitting yarns 4 while these yarns are twisted.

According to the second embodiment in FIG. 3, too, there can be obtained a gland packing 10 which produces operational effects similar to those produced by the first embodiment.

Figure 4:
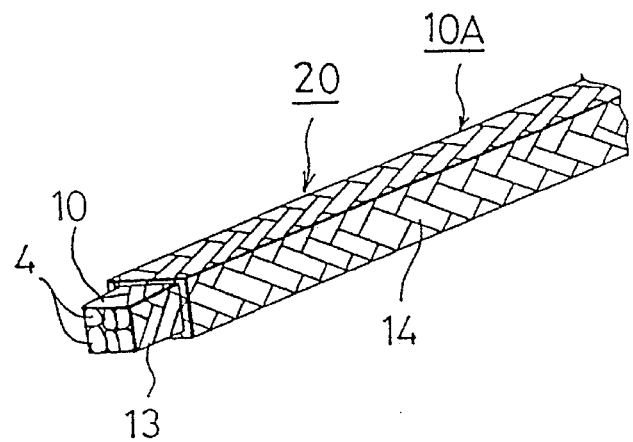
FIG. 4 is a perspective view of a third embodiment of the gland packing according to the present invention.

FIG. 4 is a perspective view of a third embodiment of the gland packing according to the present invention. In the third embodiment, the same and like parts are designated by the same reference numerals used in the first and second embodiments. The detailed description of these same and like parts is omitted here.

A gland packing 10A has, as a center member 13, the gland packing 10 shown in the first embodiment, and a covering layer 14 of a braided body made of carbon fibers which covers the entire outer periphery of the center member 13.

According to the third embodiment shown in FIG. 4, too, there can be obtained the gland packing 10A which produces operational effects similar to those produced by the first and second embodiments and which has a very high strength.

Figure 5:
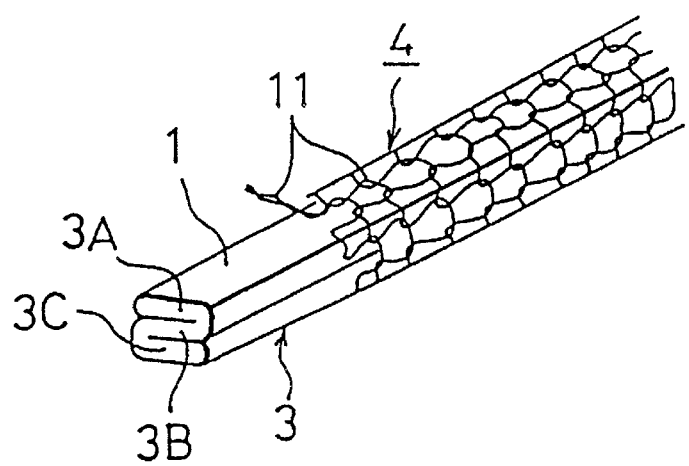
FIGS. 5 to 11 are perspective views of other embodiments of the knitting yarn for gland packing according to the present invention.

As the string-like body 3 used in each of the first to third embodiments, there is used not only a string-like body which has been subjected in the longitudinal direction thereof to the crimpling molding 1A by corrugating or embossing as shown in. FIG. 2, but also a string-like body, as shown in FIG. 5, which is made by not subjecting an expanded graphite tape 1 to the crimpling molding 1A, but by simply folding the expanded graphite tape 1 in the widthwise direction thereof form folded layers 3A, 3B, 3C.

Figure 6:
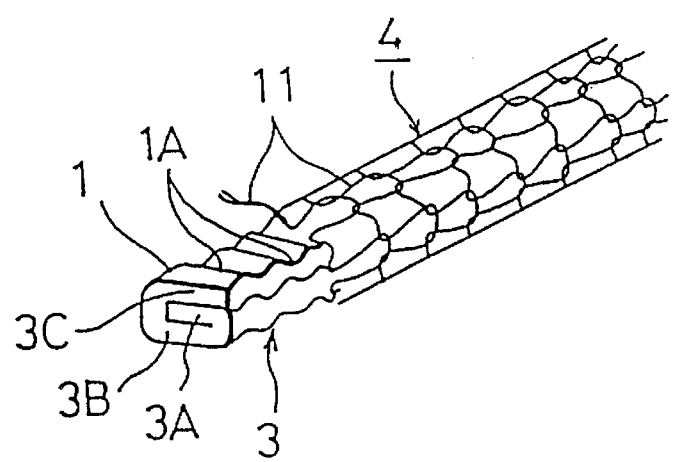

Further, there may be used a string-like body 3, as shown in FIG. 6, in which an expanded graphite tape 1 is subjected to the crimpling molding 1A and then folded in the widthwise direction thereof to form folded layers 3A, 3B, 3C, such that the folding line of the expanded graphite tape 1 in section presents a whirlpool or spiral shape and that the expanded graphite tape 1 presents a rectangular section in outline.

Figure 7:
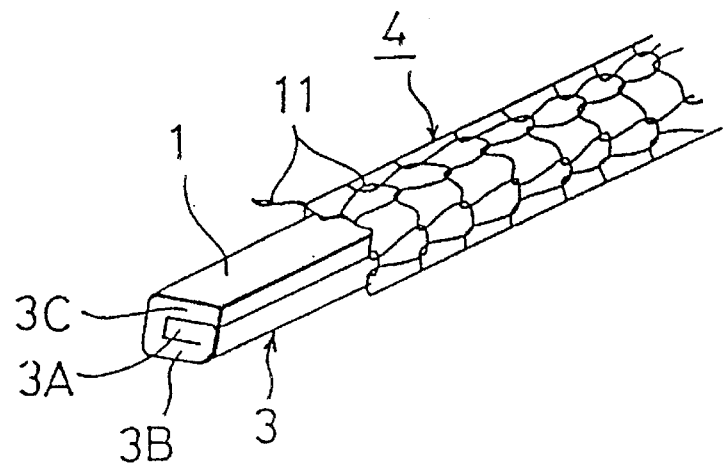

Further, there may be used a string-like body 3 as shown in FIG. 7, in which an expanded graphite tape 1 is not subjected to the crimpling molding but simply folded in the widthwise direction thereof to form folded layers 3A, 3B, 3C, such that the folding line of the expanded graphite tape 1 in section presents a whirlpool shape and that the expanded graphite tape 1 presents a rectangular section in outline.

Figure 8:
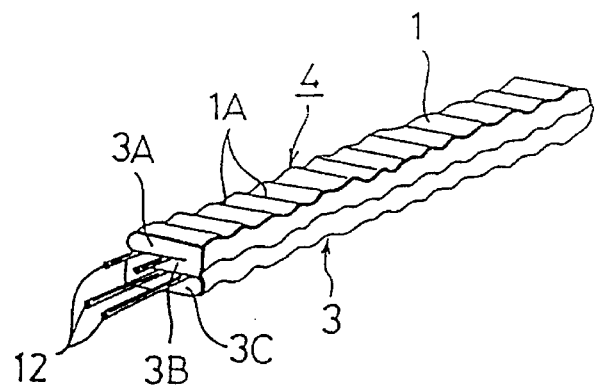

FIG. 8 is a perspective view of another example of the knitting yarn for gland packing according to the present invention. In FIG. 8, the knitting yarn 4 has a composite structure comprising a string-like body 3 and a plurality of yarn-like second reinforcing members 12. The string-like body 3 comprises an expanded graphite tape 1 cut so as to have a wide width. The expanded graphite tape 1 is subjected in the longitudinal direction thereof to crimpling molding 1A by corrugating or embossing as to present mountain and valley portions, and then folded thus forming folded layers 3A, 3B, 3C. The second reinforcing members 12 are interposed among the folded layers 3A, 3B, 3C of the string-like body 3 in the longitudinal direction thereof, each of the second reinforcing members 12 being made, for example, of a SUS304 (stainless steel) wire having a diameter of 0.1 mm.

In the knitting yarn 4 in FIG. 8, the string-like body 3 presents no slip among the folded layers 3A, 3B, 3C, thus enhancing the integrally bonding force between the string-like body 3 and the yarn-like second reinforcing members 12. This restrains the uneven distribution of the yarn-like second reinforcing members 12, thus assuring uniform strength.

Figure 9:
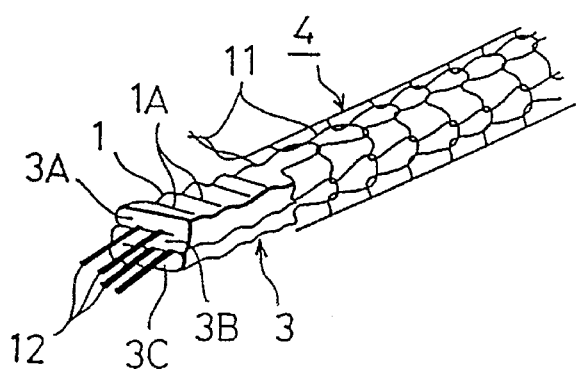

The knitting yarn 4 may have a composite structure as shown in FIG. 9, in which the first reinforcing member 11 shown in FIG. 2 and the second reinforcing members 12 shown in FIG. 8 are jointly used. When the first and second reinforcing members 11, 12 are jointly used in the manner mentioned above, the synergistic effect of both reinforcing members 11, 12 can further enhance the packing strength.

Figure 10:
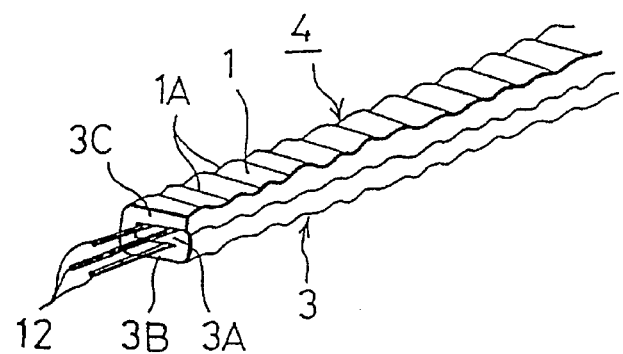

Further, the knitting yarn 4 may have a composite structure as shown in FIG. 10, which comprises a string-like body 3 and a plurality of yarn-like second reinforcing members 12. The string-like body 3 is made of an expanded graphite tape 1, which is subjected to the crimpling molding 1A and then folded in the widthwise thereof to form folded layers 3A, 3B, 3C, such that the folding line of the expanded graphite tape i in section presents a whirlpool shape and that the expanded graphite tape 1 presents a rectangular section in outline. The yarn-like second reinforcing members 12 are interposed among the folded layers 3A, 3B, 3C of the string-like body 3 in the longitudinal direction thereof. Like the string-like body 3 shown in FIG. 8, the string-like body 3 in FIG. 10 presents no slip among the folded layers 3A, 3B, 3C, thus enhancing the integrally bonding force between the string-like body 3 and the yarn-like second reinforcing members 12. This restrains the uneven distribution of the yarn-like second reinforcing members 12, thus assuring uniform strength.

Figure 11:
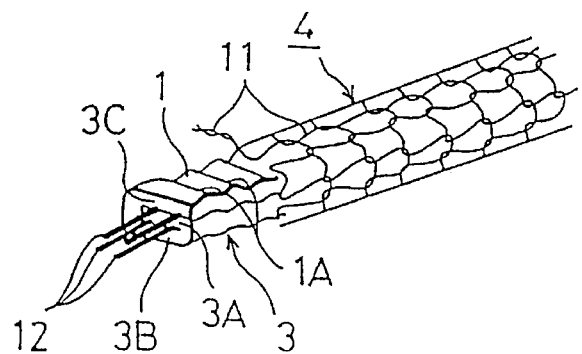
Figure 12:
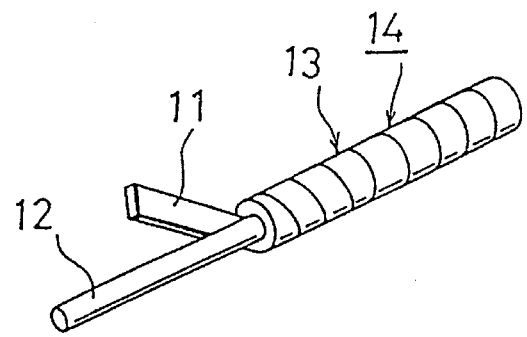
FIGS. 12 to 15 are perspective views of conventional examples of the knitting yarn for gland packing.
Figure 13:
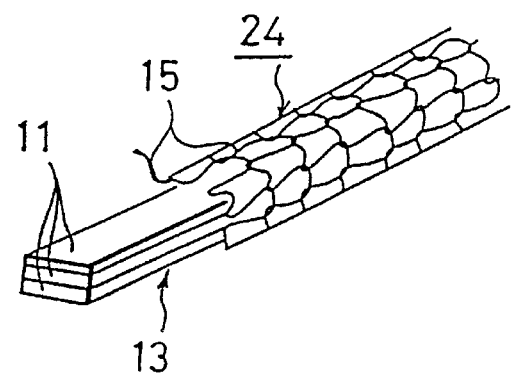
Figure 14:
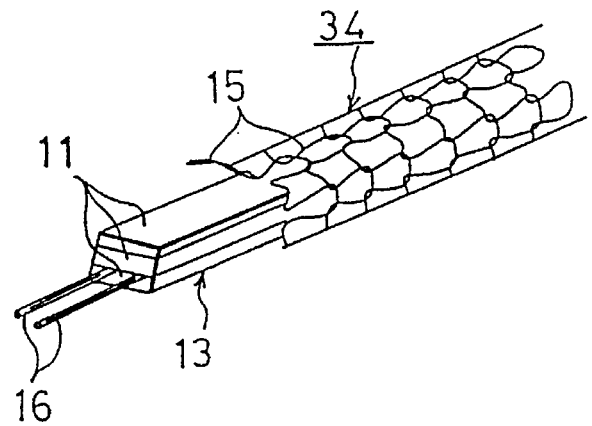
Figure 15:
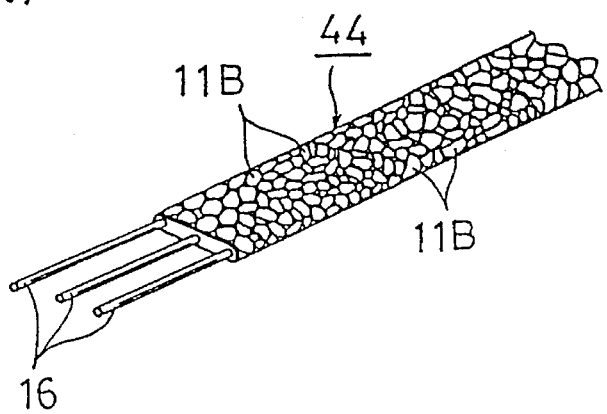

Further, the knitting yarn 4 may have a composite structure as shown in FIG. 11, in which the first reinforcing member 11 as shown in FIG. 6 and the yarn-like second reinforcing members 12 as shown in FIG. 10 are jointly used.

The description has been made of the respective embodiments in which stainless steel or Inconel wires are used as the first and second reinforcing members 11, 12, and carbon fibers are used as the covering layer 14 which covers the center member 13. Instead of the stainless steel or Inconel wires and carbon fibers mentioned above, there may be used, as the first and second reinforcing members 11, 12 and the covering layer 14, (i) inorganic fibers such as glass fibers, (ii) organic fibers such as cotton, PTFE (polytetrafluoroethylene), Aramide, high-strength polyethylene, high-strength Vinylon, PPS (polyphenylene sulfide), PEEK (polyether ether ketone), polyallylate or the like, and (iii) metallic fibers such as Monel or metallic fine wires.

What is claimed is:

1. A knitting yarn for a gland packing having a composite structure, comprising:

a string-like body formed from an expanded elongated graphite tape which is so cut as to have a wide width and contains crimpling molding in the longitudinal direction thereof effected by corrugating or embossing and is folded in the widthwise direction thereof, thus forming a plurality of layers;

a first reinforcing member made of a knitted or braided body for covering the entire outer peripheral surface of said folded string-like body; and a yarn-like second reinforcing member, such as organic fibers, interposed between said folded layers of said string-like body and extending in the longitudinal direction thereof.

2. The knitting yarn as defined in claim 1, wherein a plurality of yarn-like second reinforcing members are interposed between the folded layers of said string-like body in the longitudinal direction thereof.

3. A gland packing comprising a plurality of knitting yarns which are braided or twisted, each knitting yarn having a composite structure which comprises:

a string-like body formed from an expanded elongated graphite tape which is so cut as to have a wide width and contains crimpling molding in the longitudinal direction thereof effected by corrugating or embossing and is folded in the widthwise direction thereof, thus forming a plurality of layers;

a first reinforcing member made of a knitted or braided body for covering the entire outer peripheral surface of said folded string-like body; and a yarn-like second reinforcing member, such as organic fibers, interposed between said folded layers of said string-like body and extending in the longitudinal direction thereof.

4. A gland packing comprising a plurality of knitting yarns which are braided or twisted, each knitting yarn having a composite structure which comprises:

a string-like body formed from an expanded elongated graphite tape which is so cut as to have a wide width and contains crimpling molding in the longitudinal direction thereof effected by corrugating or embossing and is folded in the widthwise direction thereof, thus forming a plurality of layers which in cross section define a spiral shape; and a yarn-like reinforcing member interposed internally between said folded yarns of said string-like body in the longitudinal direction thereof.

* * * * *

UNITED STATES PATENT AND TRADEMARK OFFICE
CERTIFICATE OF CORRECTION

PATENT NO.   : 5,605,341
DATED        : February 25, 1997
INVENTOR(S)  : Takahisa Ueda It is certified that error appears in the above-indentified patent and that said Letters Patent is hereby corrected as shown below:

On the cover page:

"[*] Notice:   The term of this patent shall not extend beyond
              the expiration date of Pat. No. 5,503,057."

should be

--[*] Notice:  The term of this patent shall not extend beyond
              the expiration date of Pat. No. 5,549,306.--

Signed and Sealed this

Fifteenth Day of July, 1997

*Attest:*

BRUCE LEHMAN

*Attesting Officer*        Commissioner of Patents and Trademarks